United States Patent [19]

Born et al.

[11] Patent Number: 4,795,576

[45] Date of Patent: * Jan. 3, 1989

[54] POLYSULFIDED OLEFIN COMPOSITIONS, THEIR PREPARATION AND USE AS ADDITIVES FOR LUBRICANTS

[75] Inventors: Maurice Born, Nanterre; Lucienne Briquet, Rueil-Malmaison; Guy Parc, Rueil-Malmaison; Daniel Paquer, Minerve, all of France

[73] Assignee: Institut Francais du Petrole, Rueil-Malmaison, France

[*] Notice: The portion of the term of this patent subsequent to Feb. 24, 2004 has been disclaimed.

[21] Appl. No.: 920,340

[22] Filed: Oct. 17, 1986

[30] Foreign Application Priority Data

Oct. 18, 1985 [FR] France ................................ 85 15499

[51] Int. Cl.$^4$ ................ C10M 135/00; C07C 149/00
[52] U.S. Cl. .................................... 252/45; 252/48.8; 568/18; 568/21
[58] Field of Search ................ 252/45, 48.8; 568/21, 568/18

[56] References Cited

U.S. PATENT DOCUMENTS 4,645,610  2/1987  Born et al. ........................... 252/45

Primary Examiner—William R. Dixon, Jr.
Assistant Examiner—Jerry D. Johnson
Attorney, Agent, or Firm—Millen & White

[57] ABSTRACT

The disclosed polysulfided olefin compositions can be used in particular as extreme-pressure additives for lubricants. They are prepared by a process comprising the steps of:

(1) reacting sulfur monochloride and/or dichloride with at least one monoolefin having 2 to 5 carbon atoms (generally isobutene) to form an "adduct"; (2) contacting said "adduct" jointly with an unsaturated monohalogenated hydrocarbon compound, in a proportion corresponding to a number of halogen gram-atoms from about 1 to 70% of the number of halogen gram-atoms of the assembly "monohalogenated hydrocarbon compound+adduct", with a sulfur compound (e.g. alkaline sulfide, hydrogenosulfide or polysulfide) and, mostly, element sulfur, in a proportion of 0 to 7 gram-atoms per mole of sulfur compound, within an aqueous or hydroalcoholic medium; (3) heating the mixture and, after settling in 2 phases, separating the organic phase containing the polysulfided olefin, and (4) optionally treating the obtained product with a base.

The obtained polysulfided olefins, depending on their sulfur content, may be used as extreme-pressure additives in oil compositions for gears or for metal working.

11 Claims, No Drawings

POLYSULFIDED OLEFIN COMPOSITIONS, THEIR PREPARATION AND USE AS ADDITIVES FOR LUBRICANTS

The invention concerns the field of sulfided organic additives used to improve the extreme-pressure properties of lubricants. It further concerns particularly new products of the polysulfided olefin type, their preparation and their use as additives for lubricants.

BACKGROUND OF THE INVENTION

A certain number of processes having as an object the preparation of polysulfided olefins for use as extreme-pressure additives for lubricants are disclosed in the prior art.

In particular, U.S. Pat. Nos. 3,471,404 and 3,697,499 disclose a process whose main steps are the following: (1) reaction of sulfur monochloride with an excess of an olefin having 2 to 5 carbon atoms, particularly isobutene, at a temperature from 20° to 80° C., so as to form an "adduct"; (2) reaction of the "adduct" of the first step with a sulfide of alkali metal (preferably sodium sulfide) and element sulfur, used in a ratio from 1.8 to 2.2 moles of metal sulfide per gram-atom of sulfur, the proportion of alkali metal being from 0.8 to 1.2 mole per mole of adduct, and the reaction being performed in the presence of an alcohol or of a hydro-alcoholic solvent, at reflux; and (3) reaction of the obtained product, containing 1 to 3% of chlorine, with an inorganic base in aqueous solution, at reflux, until the chlorine residual content of the product be lower than 0.5%.

It is stated in these prior art patents, that the sulfur content of the obtained products could be from 40 to 60% by weight. In fact, it is more often of 46% by weight. These products may be used as extreme-pressure additives for lubricating oils, transmission fluids or greases, the considered lubricating bases consisting of mineral oils and certain synthetic oils.

On the other hand, U.S. Pat. No. 4,204,969 discloses a rather similar process to prepare polysulfided olefins for use as extreme-pressure additives for lubricating oils. This process comprises the following main steps of:

(1) reacting, at about 30°–100° C., sulfur monochloride with a $C_3$–$C_6$ aliphatic monoolefin (generally isobutene) preferably in the presence of a promoter consisting of a lower alcohol, so as to form an "adduct";

(2) reacting said "adduct" with sulfur and sodium sulfide (prepared for example from NaOH, NaHS and/or $H_2S$) in a proportion of 0.1 to 0.4 gram-atom of sulfur per mole of sodium sulfide, in hydroalcoholic medium, at a temperature from 50° C. to reflux temperature; and recovering the obtained product without treatment by means of a base.

In the single example of this patent, the prepared product is stated to have a sulfur content of 49% by weight and a viscosity at 37.8° C. (100° F.) of 8.6 $mm^2/s$ (cSt).

When it is desired, by using the processes of the prior art, to increase the sulfur content of the additives by increasing the proportion of element sulfur used in their preparation, as compared to the involved amount of the alkaline sulfide or hydrogenosulfide, the obtained products have no longer a sufficient solubility in synthetic lubricating oils (e.g. of the polyalphaolefin type) or even in mineral lubricating oils, to be used as extreme-pressure additives. Moreover, the kinematic viscosity of the so-obtained products is generally too high.

In the French Pat. No. 2,563,231, the applicant has already disclosed a process for the preparation of polysulfided olefins, defined mainly by the following steps of:

(1) reacting at least one compound selected from sulfur monochloride and sulfur dichloride with at least one monoolefin having 2 to 5 carbon atoms (generally isobutene), in a proportion from 1.5 to 2.5 moles of monoolefin per mole of sulfur monochloride and/or dichloride, thus forming an addition product or "adduct";

(2) contacting said "adduct" and at least one hydrocarbyl halide selected from $C_1$–$C_{12}$ alkyl-, $C_5$–$C_{12}$ cycloalkyl- or substituted cycloalkyl-, and $C_6$–$C_{12}$ arylalkyl- or substituted arylalkyl-chlorides, bromides and iodides, the proportion of said hydrocarbyl halide corresponding to 2–40% of halogen gram-atoms in proportion to the total number of halogen gram-atoms of the assembly formed by said "adduct" and said hydrocarbyl halide (i.e. 0.015–0.55 gram-atom of halide per 100 g of "adduct"), with at least one sulfur compound selected from sulfides, hydrogenosulfides and polysulfides of alkali metals, ammonium or alkaline-earth metals, used in a proportion of about 0.4–0.8 mole per halogen gram-atom contained in the whole assembly formed by said "adduct" and said hydrocarbyl halide, and a proportion of element sulfur from 0 to 4 gram-atoms per mole of said sulfur compound, within a medium consisting of water or a mixture of water with aliphatic monoalcohol;

(3) heating the resultant mixture and, after separation in two phases, recovering the polysulfided olefin in the organic phase, and (4) optionally treating the product obtained from step (3) with a basic compound such as an inorganic base.

This prior art patent indicates the so-prepared products are polysulfided olefins, whose sulfur content may reach generally up to 45–55% by weight and sometimes more (about 60% by weight). Their kinematic viscosity at 100° C. varies in relation with their sulfur content. It may range from about 4 to 20 $mm^2/s$. Their halogen (mainly chlorine) content is generally lower than about 1% by weight and mostly than about 0.6% by weight.

The products whose preparation involves the use of the highest elemental sulfur proportions are conveniently used to form oils for metal working (cutting, shaping etc.). In this application there is the possibility of using polysulfided olefins prepared by using molar ratios of sulfur compound to element sulfur as low as 0.3/1, these products (of very high sulfur content) being still sufficiently soluble in base oils of mineral origin used in the lubricant compositions for metal working (e.g. 100 Neutral Solvent).

Here, the additive concentration is generally about 0.5–2% by weight.

In the application for the first addition certificate to the above-mentioned French Pat. No. 2,571,380, the applicant has extended the definition of the process for preparing polysulfided olefins to a process wherein, in step (2), the proportion of hydrocarbyl halide ranges from 40 to 70%, as halogen gram-atoms, with respect to the total number of halogen gram-atoms of the assembly formed by the "adduct" obtained in step (1) and said hydrocarbyl halide, and the proportion of element sulfur may reach up to 7 gram-atoms per mole of sulfur compound involved.

The process thus provides, particularly for the highest ratios "element sulfur gram-atoms/sulfur compound moles" (e.g. about from 3.3/1 to 7/1), products of very high sulfur content (up to about 60–65% by weight) and of still increased solubility in oils designed for metal working (e.g. of the 100 Neutral Solvent or naphthenic Spindle oil type).

The two above-mentioned specifications are coupled in particular in the European patent application No. 0,159,936.

SUMMARY OF THE INVENTION

It has now been discovered that it is possible to prepare new polysulfided olefins compositions which can be used advantageously as additives for lubricants.

The polysulfided olefin compositions according to the invention may be defined generally as in the above-mentioned French Pat. No. 2,563,231 and application for addition certificate No. 2,571,380, with the exception that, in the second step of their preparation, at least one unsaturated hydrocarbyl monohalide or monohalogenated hydrocarbon compound is used jointly with the addition product (or "adduct") obtained from the first step.

Thus, the compositions according to the invention are defined as being obtained by a process comprising the steps of:

(1) reacting, for example at a temperature from 20° to 80° C., at least one compound selected from sulfur monochloride and sulfur dichloride with at least one aliphatic monoolefin of 2 to 5 carbon atoms, thus forming an addition product or "adduct", (2) contacting said "adduct" and at least one monohalogenated unsaturated hydrocarbon compound, as hereinafter defined, with at least one sulfur compound selected from sulfides, hydrogenosulfides and polysulfides of alkali metals, ammonium or alkaline-earth metals and, mostly, elemental sulfur, within an aqueous or hydroalcoholic medium maintained, for example, at a temperature from 20° to 100° C. during the introduction of the various reactants, (3) heating the resultant mixture at a temperature from 50° C. to reflux temperature and, after settling, removing the lower aqueous phase and recovering the polysulfided olefin in the upper organic phase, and (4) optionally treating the obtained product with a basic compound such as a mineral base.

The starting olefins may contain 2 to 5 carbon atoms and may be used alone or as mixtures. Isobutene is mostly used. These olefins may also be used as mixtures with minor proportions of olefins having more than 5 carbon atoms (e.g. diisobutene).

The olefin may be used in a proportion from 1.5 to 2.5 moles, preferably from 1.8 to 2.2 moles per mole of sulfur monochloride and/or sulfur dichloride. It is generally introduced in the liquid sulfur monochloride and/or sulfur dichloride at a temperature from 20° to 80° C., more specifically from 30° to 50° C.

In step (2) of the process, the monohalogenated unsaturated hydrocarbon compound, used jointly with the "adduct" obtained in step (1), may be a chloride, bromide or iodide of $C_2$–$C_{12}$ (preferably $C_2$–$C_4$) straight or branched alkenyl, of $C_5$–$C_{12}$ (preferably $C_6$) cycloalkenyl, optionally alkyl-substituted, or of $C_6$–$C_{12}$ (preferably $C_8$ and $C_9$) arylalkenyl, optionally alkyl-substituted on the aryl radical.

It may also consist of a monohalogenated, unsaturated aliphatic or cyclic hydrocarbon comprising at least one heteroatom such as sulfur, oxygen or nitrogen in its chain or ring.

For reasons of operation, monohalogenated unsaturated hydrocarbon compounds of boiling point ranging for example from 100° to 150° C. are considered as particularly advantageous.

Specific examples are, in particular 1-chloroethylene, 1-chloropropene, 2-chloropropene, 3-chloropropene, 1-chloro 1-butene, 1-chloro 2-butene, 2-chloro 2-butene, 3-chloro 1-butene, 1-chloro 2-methylpropene, 3-chloro 2-methylpropene or 3-chloro 1-phenyl 1-propene, or 2-chlorothiophene.

The proportion of monohalogenated unsaturated hydrocarbon compound must be sufficient to obtain a substantial improvement in the properties of the final product. It is generally from 1 to 70%, expressed as halogen gram-atoms in proportion to the total number of halogen gram-atoms of the "adduct+monohalogenated compound" assembly. This proportion generally corresponds to a number of moles of monohalogenated compound of about 0.015 to 1.9 for 100 g of "adduct", particularly when the starting olefin is isobutene.

Within the scope of the invention it is possible to replace a portion, for example up to 90% by moles, more particularly up to 50% by moles, of the above-defined monohalogenated unsaturated hydrocarbon compound by an equivalent molar amount of at least one saturated monohalogenated hydrocarbon compound and/or at least one monohalogenated hydrocarbon compound further comprising at least one functional group having one or more heteroatoms (such as oxygen and/or nitrogen and/or sulfur), as hereinafter defined.

The monohalogenated saturated hydrocarbon compounds may be straight or branched alkyl (e.g.: $C_1$–$C_8$), cycloalkyl, optionally substituted (e.g.: $C_6$), or arylalkyl, optionally alkyl-substituted on the aryl radical (e.g.: $C_7$ and $C_8$) chlorides, bromides or iodides.

Examples are mainly methyl, ethyl, isopropyl, n-propyl, tert-butyl, isobutyl, n-butyl, tert-amyl, isoamyl, n-amyl, n-hexyl, 2-ethylhexyl, n-octyl, cyclohexyl and benzyl chlorides, bromides and iodides and mixtures thereof. Isopropyl chloride, n-butyl chloride and bromide, n-octyl chloride, cyclohexyl chloride or benzyl chloride are advantageously used.

The functional moohalogenated hydrocarbon compounds may consist mainly of monochlorinated or monobrominated compounds. They are advantageously selected from:

a—monohalogenated compounds having at least one alcohol group, particularly:
  halides of aliphatic, alicyclic or aromatic-aliphatic monoalcohols containing, for example, 2 to 18 carbon atoms,
  polyol halides (and the corresponding epoxy derivatives), and
  halides of (poly-) oxalkylenated monoalcohols b—monohalogenated compounds containing at least one phenol group, c—monohalogenated compounds containing at least one carboxylic group, d—monohalogenated compounds containing at least one amine group, particularly aliphatic, alicyclic or aromatic-aliphatic compounds, e—monohalogenated compounds containing at least one amide group, or f—monohalogenated compounds containing at least one thiol group.

Examples of functional monohalogenated compounds having groups of several different types are:
compounds with hydroxyl and carboxylic acid groups,
compounds with amine and carboxylic acid groups, or
compounds with hydroxyl and amine groups.

More specific examples of such compounds are given in the European patent application No. 0,159,936 to the applicant.

The sulfur compound used in step (2) may be selected from sulfides, hydrogenosulfides and polysulfides of alkali metals (e.g. sodium or potassium), alkaline-earth metals (e.g. magnesium or calcium), or ammonium. Sodium sulfide, sodium hydrogenosulfide (e.g. in the presence of sodium hydroxide) and sodium polysulfides are mostly used. Said sulfur compound is used in a proportion of about 0.4 to 0.8 mole per halogen gram-atom contained in the assembly "adduct+monohalogenated hydrocarbon".

Elemental sulfur, optionally used in step (2) together with the sulfur compound, may be present in a molar ratio with the latter up to about 7/1 (more particularly from 0.4/1 to 7/1), which corresponds to an inverse ratio which may be as low as about 0.14/1 (more particularly from 0.14/1 to 2.5/1).

Generally, in step (2), the sulfur compound is introduced (or formed) and the optional elemental sulfur is introduced in water or, preferably, in a mixture of water with a lower aliphatic monoalcohol (containing for example 1 to 4 carbon atoms).

Examples of lower aliphatic monoalcohols are: methanol, ethanol, n-propanol, isopropanol, n-butanol, isobutanol and tert-butanol, isopropanol being preferred. The water-alcohol mixture may contain for example 2 to 60% by weight of alcohol (preferably 5 to 45%) with respect to water.

To the so-formed medium, maintained under stirring (at 20°–100° C.), are added together the addition product from step (1) and the monohalogenated hydrocarbon, over a period from a few minutes to several hours, e.g. from 10 minutes to 3 hours.

In step (3) the temperature is brought within the range e.g. from 50° C. to reflux temperature for e.g. 3–24 hours.

Step (4) of treating the product obtained in step (3) may be performed by means of a basic compound, consisting, for example, of an inorganic base (such as sodium or potassium hydroxide) in aqueous solution. The sodium or potassium hydroxide contents of the aqueous solutions may be, for example, from 0.5 to 20% by weight.

The reaction of step (2) of the process according to the invention and the subsequent treatments may be performed continuously. The operation is then preferably conducted with a system comprising parallel feeding streams of reactants with multiple contacts (rather than counter-current), this arrangement leading generally to better properties in the obtained final products.

The compositions of the invention, as above-defined, consist of mixtures of polysulfided olefins whose sulfur content is generally from 40 to 65% by weight. Their kinematic viscosity at 100° C., depending on their sulfur content, ranges from 4 to 20 mm$^2$/s. Their halogen content (mainly chlorine) content is generally lower than about 1% and preferably than 0.6% by weight.

These products are generally soluble in mineral oils and in most synthetic oils, at substantial concentrations and, for some of them, even in any proportion. The products of higher sulfur content may have a reduced solubility in lubricating oils but this solubility is still sufficient for certain applications for which they are designed (additives for metal working oils as hereinafter indicated).

The products according to the invention are particularly useful in oil compositions for lubrication of gears.

The base oils may be of mineral or synthetic origin. Synthetic oils include in particular olefin oligomers such as tri-, tetra- or pentamers of 1-decene obtained by oligomerization in the presence of Lewis acids. Of course, other α-olefins, for example $C_6$–$C_{14}$ α-olefins may be used.

It is also possible to use alkylbenzenes, such as mono- and di-alkylbenzenes, or still synthetic esters obtained from mono- or poly-carboxylic acids (such as sebacic acid, fatty acids etc.) and from monoalcohols or polyols (such as 2-ethylhexanol, trimethylolpropane, etc.).

In this application, polysulfided olefins can be used whose preparation involves relatively low sulfur proportions (molar ratio of elemental sulfur to sulfur compound of, for example, 0.4 to 0.55/1) as well as higher sulfur proportions.

For reasons of solubility in the selected lubricant and of corrosiveness of the additive, the molar ratio "elemental sulfur/sulfur compound" may reach about 2.5/1 for additives used in mineral oils and about 0.7/1 for additives used in synthetic oils.

These polysulfided olefins have generally a sulfur content from 40 to 50% by weight.

The polysulfided olefins may then be added to lubricating oils at concentrations of, for example, 0.5 to 7% by weight.

These additives may be used in combination with phosphorus-containing additives such as metal dialkyl- or diaryl-dithiophosphates, organic phosphites and phosphates.

Other conventional additives may be added such as antioxidants, anti-rust agents, copper deactivators, antifoam agents, friction reducers and/or in conventional proportions.

The products according to the invention may also be advantageously used in oil compositions for metal working (cutting, shaping, etc.).

For this application, in addition to polysulfided olefins whose preparation involves sulfur proportions corresponding to molar ratios "elemental sulfur/sulfur compounds" up to 2.5/1 (as above-indicated for gear oils), other polysulfided olefins whose preparation involves a higher molar ratio "elemental sulfur/sulfur compound" up to about 7/1, can also be used, since these products, whose sulfur content, generally of at least 50%, may reach 60 to 65% by weight, are surprisingly sufficiently soluble in base oils of mineral origin used in lubricating compositions for metal working (e.g. 100 Neutral Solvent).

Here, the additive concentration is usually of about 0.1 to 10% by weight, preferably 0.5–5% by weight, in the lubricating oil.

For this application, other conventional additives may be added, such as chlorinated paraffins in a proportion corresponding, for example, to 2–10% by weight of chlorine with respect to the lubricating oil.

EXAMPLES

The following examples illustrate the invention but must not be considered as limiting in any way the scope thereof. Example 1 is given for comparison purposes.

EXAMPLE 1

(Comparative)

A reactor of 5 liters capacity, heated to 40°–45° C., is fed with 1900 g of sulfur monochloride $S_2Cl_2$ (14.07 moles) and then, through a dip tube, under the continuously stirred $S_2Cl_2$ surface, with 1780 g of isobutene (34.27 moles) wherein 17.8 g of methanol are dissolved. The reaction medium temperature is maintained between 45° and 50° C. during the 3 hours of isobutene introduction. The obtained product, called the "adduct", amounts to 3520 g.

A second reactor of 1 liter capacity, made of stainless steel, of the Grignard type, and adapted to withstand pressure, is fed successively with 296 g of water, 159.3 g of $Na_2S$ at 60% as scales (1.225 mole), 19.5 g of finely divided sulfur (0.609 gram-atom) and 31 cm³ of isopropanol, the molar ratio $Na_2S/S$ being equal to 2 in this case. The mixture is heated to 80° C. under stirring for one hour, then the temperature is reduced to 45° C.

250 g of the precedingly obtained addition product are then introduced, by means of a proportioning pump, in the continuously stirred aqueous medium, said introduction being performed in 0.75 hour. The temperature of the reaction medium progressively increases from 45° to 75° C. The mixture is then heated to 105° C. for 15 hours under vigorous stirring.

The mixture is cooled to about 80° C., stirring is discontinued, and after settling for 0.5 hour, the lower aqueous phase is removed. Then, 200 cm³ of sodium hydroxide aqueous solution at 10% by weight are added to the organic phase. The mixture is again heated to 105° C. for 6 hours.

The organic phase, recovered after settling, is washed three times with 200 cm³ of water, then dried under vacuum of 2666 Pa at 100° C. for 1 hour, then filtered in the presence of diatomaceous earth. The obtained product consists of 187 g of a yellow-orange liquid having the following characteristics:

S (% by weight): 47.6
Cl (% by weight): 0.45
Viscosity at 100° C. (mm²/s): 11.9

EXAMPLE 2

The operating conditions of Example 1 are repeated but with introduction, in the alkaline polysulfide solution, by means of the proportioning pump, of a mixture consisting of 200 g of $S_2Cl_2$/isobutene addition product and 25.31 g of chloroethylene (vinyl chloride), i.e., 0.405 mole. After treatment, 172 g of a yellow-orange fluid are recovered whose characteristics are the following:

S (% by weight): 45.8
Cl (% by weight): 0.54
Viscosity at 100° C. (mm²/s): 6.8

EXAMPLES 3 TO 7

In the solution of alkaline polysulfide are introduced, as in example 2, mixtures consisting of 200 g of $S_2Cl_2$/isobutene addition product and 0.405 mole of various hydrocarbenyl chlorides:

Example 3: 3-chloropropene (allyl chloride): 31 g
Example 4: 3-chloro 1-butene: 36.65 g
Example 5: 1-chloro 2-butene (crotyl chloride): 36.65 g
Example 6: 3-chloro 2-methylpropene (methallyl chloride): 36.65 g
Example 7: 3-chloro 1-phenyl 1-propene (cinnamyl chloride): 61.8 g The characteristics of the obtained products are reported in Table I hereinafter.

TABLE I

OPERATING CONDITIONS:
Introduction of the hydrocarbenyl halide/adduct mixture in 45 minutes
$Na_2S/S = 2/1$ molar

| Example | "Adduct" | Hydrocarbenyl halide Nature | Amount(g) | Product weight(g) | Viscosity at 100° C. (mm²/s) | S (% b.w.) | Cl (% b.w.) | Solubility** at 5% b.w. in PAO* at 20° C. |
|---|---|---|---|---|---|---|---|---|
| 1(Comp) | 250 | None | — | 187 | 11.9 | 47.6 | 0.45 | insol |
| 2 | 200 | Vinyl chloride | 25.31 | 172 | 6.8 | 45.8 | 0.54 | sol |
| 3 | 200 | Allyl chloride | 31.00 | 178 | 6.5 | 46.8 | 0.42 | sol |
| 4 | 200 | 3-chloro 1-butene | 36.65 | 182 | 5.2 | 45.9 | 0.48 | sol |
| 5 | 200 | Crotyl chloride | 36.65 | 184 | 5.4 | 46.2 | 0.51 | sol |
| 6 | 200 | Methallyl chloride | 36.65 | 183 | 5.4 | 46.4 | 0.50 | sol |
| 7 | 200 | Cinnamyl chloride | 61.8 | 197 | 5.8 | 40.4 | 0.39 | sol |

*PAO: mixture of hydrogenated polyalphaolefins (SAE 90)
**The additives which are only partly soluble (apparition of a turbidity) are considered as insoluble.

EXAMPLE 8

Example 1 is repeated with the use of a mixture comprising 200 g of $S_2Cl_2$/isobutene addition product and 48 g of 2-chlorothiophene (0.405 mole). After treatment, 187 g of a fluid yellow-orange product are recovered, whose characteristics are:

S (% by weight): 47.5
Cl (% by weight): 0.55
Viscosity at 100° C. (mm²/s): 6.1
Solubility at 20° C. in PAO (SAE 90): soluble

EXAMPLE 9

Example 1 is repeated with the use of 159.3 g of $Na_2S$ at 60%, as scales (1.225 mole), 196 g of finely divided sulfur (6.115 gram-atoms), 31 cm³ of isopropanol (the $Na_2S/S$ molar ratio in this case is 0.2), and a mixture formed of 93.65 g of $S_2Cl_2$/isobutene addition product and 114.3 g of crotyl chloride (1.263 mole). After reaction at 105° C., settling and removal of the aqueous phase, the organic phase is treated under vigorous stirring for 6 hours at 105° C. with 200 cm³ of a 4% by weight sodium hydroxide aqueous solution.

The organic phase recovered after settling is washed three times with 200 cm³ of water. It is dried under a vacuum of 2666 Pa at 100° C. for 1 hour, then filtered in the presence of diatomaceous earth. 274 g of a yellow-orange fluid are thus obtained, whose characteristics are:
S (% by weight): 64.2
Cl (% by weight): 0.25
Viscosity at 100° C. (mm²/s): 5.6

EXAMPLE 10

The corrosiveness of the additives according to the invention with respect to copper is evaluated from corrosion tests on a coopper strip according to standard ASTM D 130 (NF M 07-015) with a SAE 90 mineral oil containing 5% by weight of sulfur-containing additive.

The obtained results, reported in table II, are expressed by a mark consisting of a number (from 1 to 4) followed with a letter, indicating the type of corrosion of the copper strip.

TABLE II

| Additive of the example | S in the additive (% by weight) | 3 hours at 121° C. |
|---|---|---|
| 2 | 45.8 | 2 a |
| 3 | 46.8 | 2 b |
| 4 | 45.9 | 2 a |
| 5 | 46.2 | 2 b |
| 6 | 46.4 | 2 a |
| 7 | 40.4 | 2 a |
| 8 | 47.5 | 2 b |
| 9* | 64.2 | 4 c** |

*Oily solution containing only 1% additive
**Identical result at 100° C.

The products for which the mark is at most equal to 3, i.e. the products of examples 2 to 8, may be used in particular for gear oil compositions. The products having a higher corrosion mark, as the product of example 9, are used more particularly for metal working oil compositions.

TABLE III

| Additive of the example | load-wear index | Welding load (kg) | ⌀ of ball marks after 1 h under 40 kg (mm) |
|---|---|---|---|
| none | 21.8 | 60 | 0.85 |
| 2 | 63.2 | 400 | 0.65 |
| 4 | 63.8 | 400 | 0.66 |
| 5 | 65.2 | 400 | 0.67 |
| 6 | 64.7 | 400 | 0.66 |
| 7 | 64.3 | 400 | 0.66 |

These results show that the additives according to the invention provide for a very substantial increase of the load-wear index and of the welding load of the balls and reduce to a large extent the ball wear. In view of their low corrosiveness, these additives are advantageously used in extreme-pressure oil compositions for industrial gears and car gears.

EXAMPLE 12

In a second series of tests, the extreme-pressure properties of the additive obtained in example 9 are evaluated from an oil composition of the metal-cutting type, by means of a 4-ball machine, according to the ASTM D 2783 standard procedure.

The lubricating composition employed was formed of a 100 Neutral Solvent mineral oil containing 3% of chlorine as chlorinated paraffin and 1% of sulfur as the sulfur-containing additive from example 9.

The results are reported in Table IV hereinafter.

These results show that the additive of high sulfur content according to the invention leads to a considerable increase of the ball welding load. Accordingly, it may be recommended in metal cutting oil compositions.

TABLE IV

| Chlorinated paraffin (% by weight) | Additive of the example | S % by weight of sulfur-containing additive | % by weight of additive in 100 N.S. oil | Solubility in 100 N.S. oil 20° C. | Solubility in 100 N.S. oil 0° C. | E.P. 4-ball tests load-wear index | E.P. 4-ball tests Charge before seizing (kgf) | E.P. 4-ball tests Welding load (kgf) |
|---|---|---|---|---|---|---|---|---|
| none | none | — | — | — | — | 21.7 | 50 | 126 |
| 4.62 | none | — | — | limpid | limpid | 39.2 | 80 | 200 |
| none | 9 | 64.2 | 1.56 | limpid | cloudy | 43.7 | 80 | 315 |
| 4.62 | 9 | 64.2 | 1.56 | limpid | limpid | 102.0 | 100 | 620 |

EXAMPLES 11 AND 12

Evaluation of the Extreme-Pressure Properties of the Additives According to the Invention Tests have been conducted which show the extreme-pressure properties of certain additives prepared according to the preceding examples, on the one hand in gear oil compositions and, on the other hand, in metal working oil compositions.

EXAMPLE 11

In a first series of tests, the products of examples 2, 4, 5, 6 and 7 have been tested with a 4-ball machine, according to ASTM D 2266 and D 2783 standard procedures, at 1.5% by weight concentration in a SAE 90 mineral oil. The results are reported in table III.

What is claimed as the invention is:

1. A polysulfided olefin composition, obtained by a process comprising the steps of: (1) reacting at least one compound selected from sulfur monochloride and sulfur dichloride with at least one monoolefin having 2 to 5 carbon atoms, in a proportion of 1.5 to 2.5 mole of monoolefin per mole of at least one of sulfur monochloride, sulfur didichloride, thus forming an addition product or "adduct", (2) contacting said "adduct" and at least one unsaturated monohalogenated hydrocarbon compound, the proportion of said unsaturated monohalogenated hydrocarbon compound corresponding to 1–70% of halogen gram-atoms in proportion to the total number of halogen gram-atoms of the assembly formed by said "adduct" and said unsaturated monohalogenated hydrocarbon compound, with at least one sulfur compound selected from sulfides, halogenosulfides and polysulfides of alkali metals, ammonium or alkaline-earth metals, used in a proportion of about 0.4 to 0.8 mole per halogen gram-atom contained in the assembly formed by said "adduct" and said unsaturated monohalogenated hydrocarbon, and a proportion of element sulfur from 0 to 7 gram-atoms per mole of said sulfur compound, within a mixture consisting of water or a mixture of water with aliphatic monoalcohol, and (3) heating the resultant mixture and, after separating it in two phases, recovering the polysulfided olefin from the organic phase.

2. A composition according to claim 1, wherein said unsaturated monohalogenated hydrocarbon compound involved in step (2) consists of a chloride, bromide or iodide of $C_2$-$C_{12}$ straight or branched alkenyl, $C_5$-$C_{12}$ cycloalkenyl or substituted cycloalkenyl, $C_6$-$C_{12}$ arylalkenyl or substituted arylalkenyl or of a monohalogenated aliphatic or cyclic hydrocarbon comprising in its chain or its ring at least one heteroatom selected from sulfur, oxygen and nitrogen.

3. A composition according to claim 2, wherein said unsaturated monohalogenated hydrocarbon compound is selected from 1-chloroethylene, 1-chloropropene, 2-chloropropene, 3-chloropropene, 1-chloro 1-butene, 1-chloro 2-butene, 2-chloro 2-butene, 3-chloro 1-butene, 1-chloro 2-methylpropene, 3-chloro 2-methylpropene, 3 chloro 1-phenyl 1-propene and 2-chlorothiophene.

4. A composition according to claim 1, wherein said sulfur compound is sodium sulfide, sodium hydrogenosulfide or a sodium polysulfide.

5. A composition according to claim 1, wherein the proportion of elemental sulfur is from 0.4/1 to 7/1 gram-atoms per mole of sulfur compound.

6. A composition according to claim 1, wherein in step (2), said "adduct" and said monohalogenated hydrocarbon compound are added to the medium containing said sulfur compound or said compound and elemental sulfur, maintained at a temperature from 20° to 100° C., in 10 minutes to 3 hours, and in that, in step (3), the mixture is heated to a temperature from 50° C. up to reflux temperature, for 3 to 24 hours.

7. A composition according to claim 1, further comprising a step (4) wherein the product obtained from step (3) is treated with a basic compound.

8. A composition according to claim 1, wherein from step (2), the operations are performed in a continuous manner, the reactants used in step (2) being contacted in parallel streams and according to a multiple contact procedure.

9. A composition according to claim 1, wherein a part of up to about 90% by moles of the unsaturated monohalogenated hydrocarbon compound involved in step (2) is replaced with an equivalent molar amount of at least one saturated monohalogenated hydrocarbon compound and/or at least one monohalogenated hydrocarbon compound having at least one functional group being an alcohol, phenol, carboxylic acid, amine, amide or thiol group.

10. A gear oil composition, comprising a major proportion of mineral or synthetic lubricating oil and, as an additive, from 0.5 to 7% by weight of at least one polysulfided olefin composition according to claim 1.

11. A metal working oil composition, comprising a major proportion of mineral lubricating oil and, as an additive, from 0.1 to 10% by weight of at least one polysulfided olefin composition according to claim 1.

* * * * *